US008706689B1

(12) United States Patent
Adam

(10) Patent No.: US 8,706,689 B1
(45) Date of Patent: Apr. 22, 2014

(54) SYSTEM AND METHOD FOR MEDIA LIFECYCLE MANAGEMENT FOR RECORDED MEDIA IN A CONTACT CENTER ENVIRONMENT

(71) Applicant: Zoom International S.R.O., Prague (CZ)

(72) Inventor: Pavel Adam, Roudnice nad Labem (CZ)

(73) Assignee: Zoom International S.R.O., Prague (CZ)

( * ) Notice: Subject to any disclaimer, the term of this patent is extended or adjusted under 35 U.S.C. 154(b) by 0 days.

(21) Appl. No.: 14/013,032

(22) Filed: Aug. 29, 2013

Related U.S. Application Data

(60) Provisional application No. 61/828,048, filed on May 28, 2013.

(51) Int. Cl.
*G06F 17/00* (2006.01)
(52) U.S. Cl.
USPC .......................................................... 707/616
(58) Field of Classification Search
None
See application file for complete search history.

(56) References Cited

U.S. PATENT DOCUMENTS

| 5,991,373 A * | 11/1999 | Pattison et al. ............. 379/93.17 |
| 2008/0032739 A1 | 2/2008 | Hoodbhoy et al. |
| 2012/0271942 A1 | 10/2012 | Walker et al. |
| 2013/0262396 A1 * | 10/2013 | Kripalani et al. ............. 707/674 |

* cited by examiner

*Primary Examiner* — Neveen Abel Jalil
*Assistant Examiner* — Tyler Torgrimson
(74) *Attorney, Agent, or Firm* — Galvin Patent Law LLC; Brian G. Galvin

(57) ABSTRACT

A system for media lifecycle management for recorded media in a contact center environment, comprising a plurality of recording servers operating on network-attached computers and adapted to record interactions in a contact center, a media lifecycle management service operating on a plurality of network-attached server computers and comprising software modules adapted to carry out relocation, archive, backup, restore, delete, and synchronize processes, a configuration service operating on a plurality of network-attached server computers, and a plurality of data storage devices attached to a network and each accessible to at least one recording server and to the media lifecycle management service and configuration service.

2 Claims, 10 Drawing Sheets

006
SYSTEM AND METHOD FOR MEDIA LIFECYCLE MANAGEMENT FOR RECORDED MEDIA IN A CONTACT CENTER ENVIRONMENT

CROSS-REFERENCE TO RELATED APPLICATIONS

This application claims priority to U.S. provisional patent application Ser. No. 61/828,048, titled "SYSTEM AND METHOD FOR MEDIA LIFECYCLE MANAGEMENT FOR RECORDED MEDIA IN A COMMUNICATION ENVIRONMENT", filed on May 28, 2013, the entire specification of which is incorporated hereby by reference.

BACKGROUND OF THE INVENTION

1. Field of the Invention

The invention relates to the field of telecommunications applications and more particularly to the field of intelligently managing media files from communication recording applications in contact centers and law enforcement.

2. Discussion of the State of the Art

An important aspect to be considered in managing any communication center is to take steps to ensure that, in the case of a customer-service communication environment, the quality of interactions with customers is as good as can reasonably be achieved. The measurement of quality, especially when considered as the measurement of quality as perceived by a customer, is a challenge of great difficulty. In order to facilitate both measurement of service quality and to monitor performance of customer service representatives, it has become commonplace for some or all communications (for example, voice calls, text chats, video conferencing, collaborative browsing, shared whiteboards, screen activity, and on other communication mediums) to be recorded in order that they can be reviewed at later more convenient time using various sampling techniques, by professionals referred to as "quality monitors" for quality review, also known in the art as quality management (QM). Virtually all contact centers of any size have a full-time staff of quality monitors.

Similarly, recorded conversations in a law enforcement or anti-terrorist communication environment (for example, public switched telephone network, Internet, cellular network, and the like) are typically used for the detection and/or prevention of criminal activity as well as for conversation re-creation, reference and evidence purposes.

By capturing, storing, managing and retrieving interactions (for example, voice calls, text chats, video conferencing, collaborative browsing, shared whiteboards, screen activity, etc.), recording communications enable organizations to comply with regulations, follow internal policies, mitigate risk of litigation, use as evidence, monitor quality of service, prevent or detect criminal activity, and leverage recorded communications to gain business insight. Whether these organizations capture every interaction or record a random sample for various purposes, the number of files generated and the size of these files continuously grow as more communications are recorded. As such, the storage space needed to house these files grows as well. Storage requirements are further increased by recordings that include screen captures, video conferencing, and other multi-media interactions coupled with the quality level of these recordings. Finally, some organizations are required to keep recording for long periods of time for compliance, customer service, evidence and/or other requirements; so re-using storage space becomes problematic if not infeasible. This often results in an exponential growth in storage requirements for communication centers. Intrinsically, many communication centers are left with either deleting files and/or regularly purchasing additional storage space which could have an impact on customer service when files that are needed are no longer available, or increased expenses to add storage space. To compound the issues, with an increasing number of files that are generated as more and more communications are recorded, the current art does not provide best practices or systems for capturing, cataloging, managing, and retrieving communication recordings efficiently. Many contact center centers backup communication recordings to DVD or tape backup after the recordings reach a certain age (for example, recordings of one year or older). DVD and tape backup storage systems are often not cataloged in the same manner as the primary storage for recording systems known in the art which renders the retrieval and use of these recordings highly inefficient if not infeasible, especially in a customer service communication center environment.

What is needed in the art is a method to efficiently catalog, archive, effectively manage and easily retrieve recorded communications for quality and analytical review to comply with regulations, follow internal policies, mitigate risk of litigation, use as evidence, monitor quality of service, prevent or detect criminal activity, leverage recorded calls to gain business insight, and the like, while reducing the need for additional storage requirements.

SUMMARY OF THE INVENTION

Accordingly, the inventor has conceived and reduced to practice, in a preferred embodiment of the invention, a system and various methods for managing the media lifecycle for communications recordings in a communication center environment.

According to a preferred embodiment of the invention, a system for media lifecycle management for recorded media in a communication environment is disclosed, comprising ☐ a plurality of recording servers operating on network-attached computers and adapted to record interactions in a communication center, ☐a media lifecycle management service operating on a plurality of network-attached server computers and comprising software modules adapted to carry out a relocation process, an archive process, a backup process, a restore process, a delete process, and a synchronize process, a configuration service operating on a plurality of network-attached server computers, and a plurality of data storage devices attached to a network and each accessible to at least one recording server and to the media lifecycle management service and the configuration service. According to the embodiment, the relocation process of the media lifecycle management service, on receipt of a request from a user to relocate media data, relocates a plurality of files comprising media from a recorded interaction from a first storage location to a second location while modifying a set of metadata pertaining to the recorded interaction by changing at least an indicia of a current storage location of recorded media; the archive process of the media lifecycle management service, on receipt of a request from a user or when required by one or more archive rules stored in the configuration service, removes a first plurality of media files pertaining to first plurality of recorded interactions from the data storage service and archives the first plurality of media files on a long-term storage medium such as an optical storage system, while modifying a set of metadata pertaining to the first plurality of recorded interactions by changing at least an indicia of a current storage location of the first plurality of media files; the backup process of the media lifecycle management service, on receipt of a request from a user or when required by one or more backup rules stored in the configuration service, creates copies of a second plurality of media files pertaining to second plurality of recorded interactions from the data storage service and backs up the second plurality of media files on a long-term storage medium such as an optical storage system, while modifying a set of metadata pertaining to the second plurality of recorded interactions by changing at least an indicia of a current backup storage location of the second plurality of media files; the restore process of the media lifecycle management service, on receipt of a request from a user or when required by one or more restore rules stored in the configuration service, retrieves copies of a third plurality of media files pertaining to third plurality of recorded interactions from a long-term storage medium such as an optical storage system and restores the third plurality of media files to the data storage service, while modifying a set of metadata pertaining to the third plurality of recorded interactions by changing at least an indicia of a current storage location of the third plurality of media files; the delete process of the media lifecycle management service, on receipt of a request from a user or when required by one or more automatic deletion rules stored in the configuration service, deletes copies of a fourth plurality of media files pertaining to fourth plurality of recorded interactions from the data storage service, while modifying a set of metadata pertaining to the fourth plurality of recorded interactions by changing at least an indicia of a current storage status to indicate that the fourth plurality of recorded interactions was deleted; and the synchronize process of the media lifecycle management service, on receipt of a request from a user or when required by one or more synchronization rules stored in the configuration service, retrieves full or partial copies of a fifth plurality of media files pertaining to a specific recorded interaction from the data storage service and synchronizes the fifth plurality of media files, wherein synchronizing the fifth plurality of media files produces a single media file corresponding to the specific recorded interaction, while modifying a set of metadata pertaining to the specific recorded interaction by adding at least an indicia of a current storage location of the synchronized media file.

According to another preferred embodiment of the invention, a method for recorded media in a communication environment, the method comprising the steps of: ☐ (a) recording an interaction in a communications center using one of a plurality of recording servers operating on network-attached server computers; (b) storing, in a network-attached data storage system, metadata pertaining to the recorded interaction, the metadata comprising at least a location of a first data file comprising recorded audio from the interaction; and (c) managing a plurality of recorded interactions using a media lifecycle management service operating on a plurality of network-attached servers accessible to the plurality of recording servers and to the data storage system, the media lifecycle management system comprising software modules adapted to carry out a relocation process, an archive process, a backup process, a restore process, a delete process, and a synchronize process, is disclosed. According to the embodiment, According to the embodiment, the relocation process of the media lifecycle management service, on receipt of a request from a user to relocate media data, relocates a plurality of files comprising media from a recorded interaction from a first storage location to a second location while modifying a set of metadata pertaining to the recorded interaction by changing at least an indicia of a current storage location of recorded media; the archive process of the media lifecycle management service, on receipt of a request from a user or when required by one or more archive rules stored in the configuration service, removes a first plurality of media files pertaining to first plurality of recorded interactions from the data storage service and archives the first plurality of media files on a long-term storage medium such as an optical storage system, while modifying a set of metadata pertaining to the first plurality of recorded interactions by changing at least an indicia of a current storage location of the first plurality of media files; the backup process of the media lifecycle management service, on receipt of a request from a user or when required by one or more backup rules stored in the configuration service, creates copies of a second plurality of media files pertaining to second plurality of recorded interactions from the data storage service and backs up the second plurality of media files on a long-term storage medium such as an optical storage system, while modifying a set of metadata pertaining to the second plurality of recorded interactions by changing at least an indicia of a current backup storage location of the second plurality of media files; the restore process of the media lifecycle management service, on receipt of a request from a user or when required by one or more restore rules stored in the configuration service, retrieves copies of a third plurality of media files pertaining to third plurality of recorded interactions from a long-term storage medium such as an optical storage system and restores the third plurality of media files to the data storage service, while modifying a set of metadata pertaining to the third plurality of recorded interactions by changing at least an indicia of a current storage location of the third plurality of media files; the delete process of the media lifecycle management service, on receipt of a request from a user or when required by one or more automatic deletion rules stored in the configuration service, deletes copies of a fourth plurality of media files pertaining to fourth plurality of recorded interactions from the data storage service, while modifying a set of metadata pertaining to the fourth plurality of recorded interactions by changing at least an indicia of a current storage status to indicate that the fourth plurality of recorded interactions was deleted; and the synchronize process of the media lifecycle management service, on receipt of a request from a user or when required by one or more synchronization rules stored in the configuration service, retrieves full or partial copies of a fifth plurality of media files pertaining to a specific recorded interaction from the data storage service and synchronizes the fifth plurality of media files, wherein synchronizing the fifth plurality of media files produces a single media file corresponding to the specific recorded interaction, while modifying a set of metadata pertaining to the specific recorded interaction by adding at least an indicia of a current storage location of the synchronized media file.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
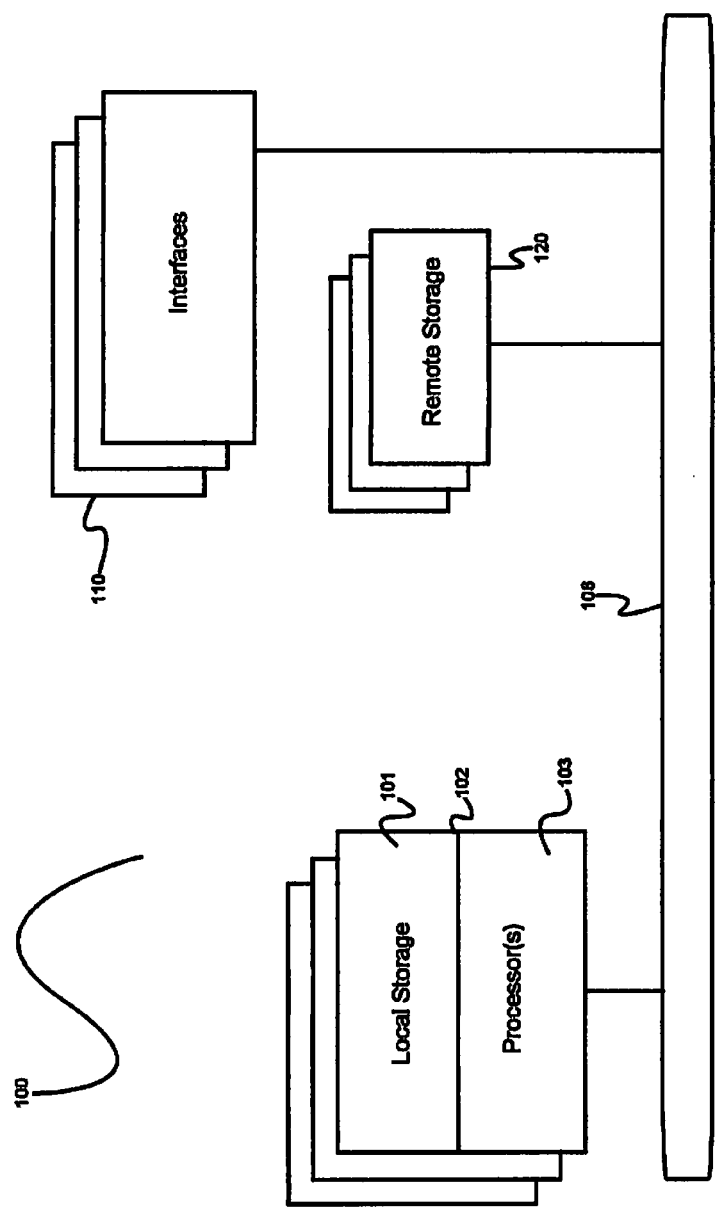
FIG. 1 is a block diagram illustrating an exemplary hardware architecture of a computing device used in an embodiment of the invention.

The inventor has conceived, and reduced to practice, a system and various methods for passive recording communications that address the shortcomings of the prior art that were discussed in the background section.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Furthermore, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of the embodiments of the present invention in which for example functions may be executed out of order from that shown or discussed, including substantially concurrently or in reverse order, depending on the functionality involved, as would be understood by those having ordinary skill in the art.

Definitions

A "communication" is defined as a discourse between one or more parties, which may be any of individuals, end points, or systems, the discourse conducts using various means including, but not limited to, plain old telephone service (POTS), Voice over IP (VoIP), video conferencing, Instant Messaging (IM), or availability presence information.

"UCM" is defined as a Unified Communication Module that handles the integration of various real-time communication services such as VoIP, instant messaging (IM), availability presence information, video conferencing, data sharing with non-real-time communication services such as voicemail, e-mail, SMS and fax.

A "recording target" is a party, that is, a person, location, endpoint or other entity, capable of initiating or receiving communications with another entity, and whose communications may be recorded by one or more systems according to the invention.

An "additional recording target" is a recording target added during execution of the system.

A "communication environment" is a technical environment, whether public or private, that facilitates communication between two entities.

A "recorded communication" is a digital recording of a discourse between two entities over a variety of communication mediums. For example, phone conversations, VoIP conversations, video conferences, instant messages, transitions in availability presence, screen activity, optical character recognition (OCR) of fax transmissions, etc.

Hardware Architecture

Generally, the techniques disclosed herein may be implemented on hardware or a combination of software and hardware. For example, they may be implemented in an operating system kernel, in a separate user process, in a library package bound into one or more network applications, on a specially constructed machine, or on a network interface card. In a specific embodiment, the techniques disclosed herein may be implemented in software such as an operating system or in an application running on an operating system.

Software/hardware hybrid implementation(s) of at least some of the embodiment(s) disclosed herein may be implemented on a programmable machine selectively activated or reconfigured by a computer program stored in memory. Such network devices may have multiple network interfaces that may be configured or designed to utilize different types of network communication protocols. A general architecture for some of these machines may appear from the descriptions disclosed herein. According to specific embodiments, at least some of the features and/or functionalities of the various embodiments disclosed herein may be implemented on one or more general-purpose network host machines such as an end-user computer system, computer, network server or server system, mobile computing device (e.g., tablet computing device, mobile phone, smartphone, laptop, and the like), consumer electronic device, music player, or any other suitable electronic device, router, switch, or the like, or any combination thereof. In at least some embodiments, at least some of the features and/or functionalities of the various embodiments disclosed herein may be implemented in one or more virtualized computing environments (e.g., network computing clouds, or the like).

Referring now to FIG. 1, there is shown a block diagram depicting a computing device 100 suitable for implementing at least a portion of the features and/or functionalities disclosed herein. Computing device 100 may be, for example, an end-user computer system, network server or server system, mobile computing device (e.g., mobile phone, smartphone, laptop, tablet computer, or the like), consumer electronic device, music player, or any other suitable electronic device, or any combination or portion thereof. Computing device 100 may be adapted to communicate with other computing devices, such as clients and/or servers, over a communications network such as the Internet, using known protocols for such communication, whether wireless or wired.

In one embodiment, computing device 100 includes central processing unit (CPU) 102, interfaces 110, and a bus 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a call recording system utilizing CPU 102, memory 101, 120, and interface(s) 110. In at least one embodiment, CPU 102 may be caused to perform one or more of the different types of functions and/or operations under the control of software modules/components, which for example, may include an operating system and any appropriate applications software, drivers, and the like.

CPU 102 may include one or more processor(s) 103 such as, for example, a processor from one of the Intel, ARM, Qualcomm, and AMD families of microprocessors. In some embodiments, processor(s) 103 may include specially designed hardware (e.g., application-specific integrated circuits (ASICs), electrically erasable programmable read-only memories (EEPROMs), field-programmable gate arrays (FPGAs), and the like) for controlling operations of computing device 100. In a specific embodiment, a memory 101 (such as non-volatile random access memory (RAM) and/or read-only memory (ROM)) also forms part of CPU 102. However, there are many different ways in which memory may be coupled to the system. Memory block 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as interface cards (sometimes referred to as "line cards"). Generally, they control the sending and receiving of data packets over a computing network and sometimes support other peripherals used with computing device 100. Among the interfaces that may be provided are Ethernet interfaces, frame relay interfaces, cable interfaces, DSL interfaces, token ring interfaces, and the like. In addition, various types of interfaces may be provided such as, for example, universal serial bus (USB), Serial, Ethernet, Firewire™, PCI, parallel, radio frequency (RF), Bluetooth™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing the techniques of the invention(s) described herein, it is by no means the only device architecture on which at least a portion of the features and techniques described herein may be implemented. For example, architectures having one or any number of processors 103 can be used, and such processors 103 can be present in a single device or distributed among any number of devices. In one embodiment, a single processor 103 handles communications as well as routing computations. In various embodiments, different types of features and/or functionalities may be implemented in a system according to the invention that includes a client device (such as a tablet device or smartphone running client software) and server system(s) (such as a server system described in more detail below).

Regardless of network device configuration, the system of the present invention may employ one or more memories or memory modules (such as, for example, memory block 120) configured to store data, program instructions for the general-purpose network operations and/or other information relating to the functionality of the embodiments described herein. The program instructions may control the operation of an operating system and/or one or more applications, for example. The memory or memories may also be configured to store configuration data, call or other media recordings, event data pertaining to recorded calls, user action information, and/or other specific non-program information described herein.

Because such information and program instructions may be employed to implement the systems/methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both machine code, such as produced by a compiler, and files containing higher level code that may be executed by the computer using an interpreter.

Figure 2:
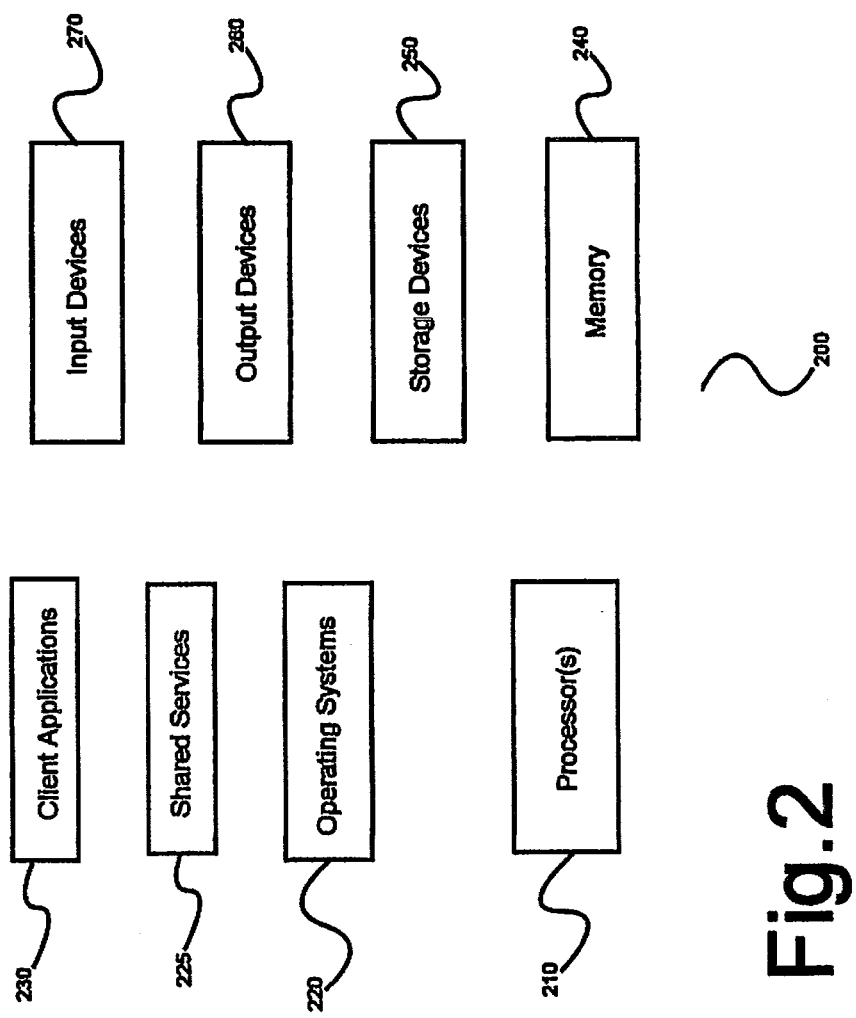
FIG. 2 is a block diagram illustrating an exemplary logical architecture for a client device, according to an embodiment of the invention.

In some embodiments, systems used according to the present invention may be implemented on a standalone computing system. Referring now to FIG. 2, there is shown a block diagram depicting an architecture for implementing one or more embodiments or components thereof on a standalone computing system. Computing device 100 includes processor(s) 103 that run software for implementing for example a recording management or other client application 200. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input device 270 can be of any type suitable for receiving user input, including for example a keyboard, touchscreen, microphone (for example, for voice input), mouse, touchpad, trackball, five-way switch, joy stick, and/or any combination thereof. Output device 260 can be a screen, speaker, printer, and/or any combination thereof. Memory 240 can be random-access memory having a structure and architecture as are known in the art, for use by processor(s) 210 for example to run software. Storage device 250 can be any magnetic, optical, and/or electrical storage device for storage of data in digital form; examples include flash memory, magnetic hard drive, CD-ROM, and/or the like.

Figure 3:
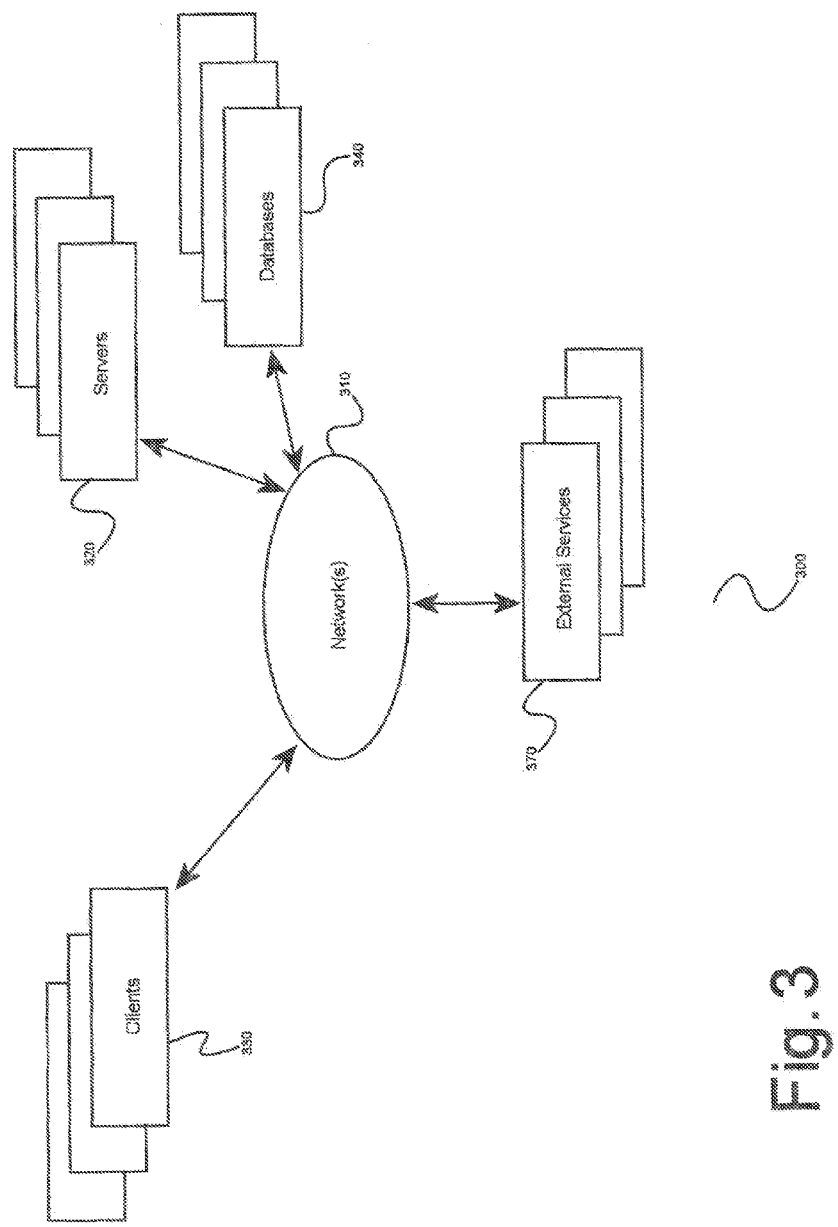
FIG. 3 is a block diagram showing an exemplary architectural arrangement of clients, servers, and external services, according to an embodiment of the invention.

In some embodiments, the system of the present invention is implemented on a distributed computing network, such as one having any number of clients and/or servers. Referring now to FIG. 3, there is shown a block diagram depicting an architecture for implementing at least a portion of a system for call recording on a distributed computing network, according to at least one embodiment.

The arrangement shown in FIG. 3, any number of clients 330 are provided; each client 330 may run software for implementing client-side portions of the present invention. In addition, any number of servers 320 can be provided for handling requests received from clients 330. Clients 330 and servers 320 can communicate with one another via electronic network 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any others). Network 310 may be implemented using any known network protocols, including for example wired and/or wireless protocols.

In addition, in some embodiment, servers 320 can call external services 370 when needed to obtain additional information, or to refer to additional data concerning a particular call. Communications with external services 370 can take place, for example, via network 310. In various embodiments, external services 370 include web-enabled services and/or functionality related to or installed on the hardware device itself. For example, in an embodiment where client application 200 is implemented on a smartphone or other electronic device, client application 200 can obtain information stored in a server system 340 in the cloud or on an external service 370 deployed on one or more of a particular enterprise's or user's premises.

In various embodiments, functionality for implementing the techniques of the present invention can be distributed among any number of client and/or server components. For example, various software modules can be implemented for performing various functions in connection with the present invention, and such modules can be variously implemented to run on server and/or client components.

Conceptual Architecture

Figure 4:
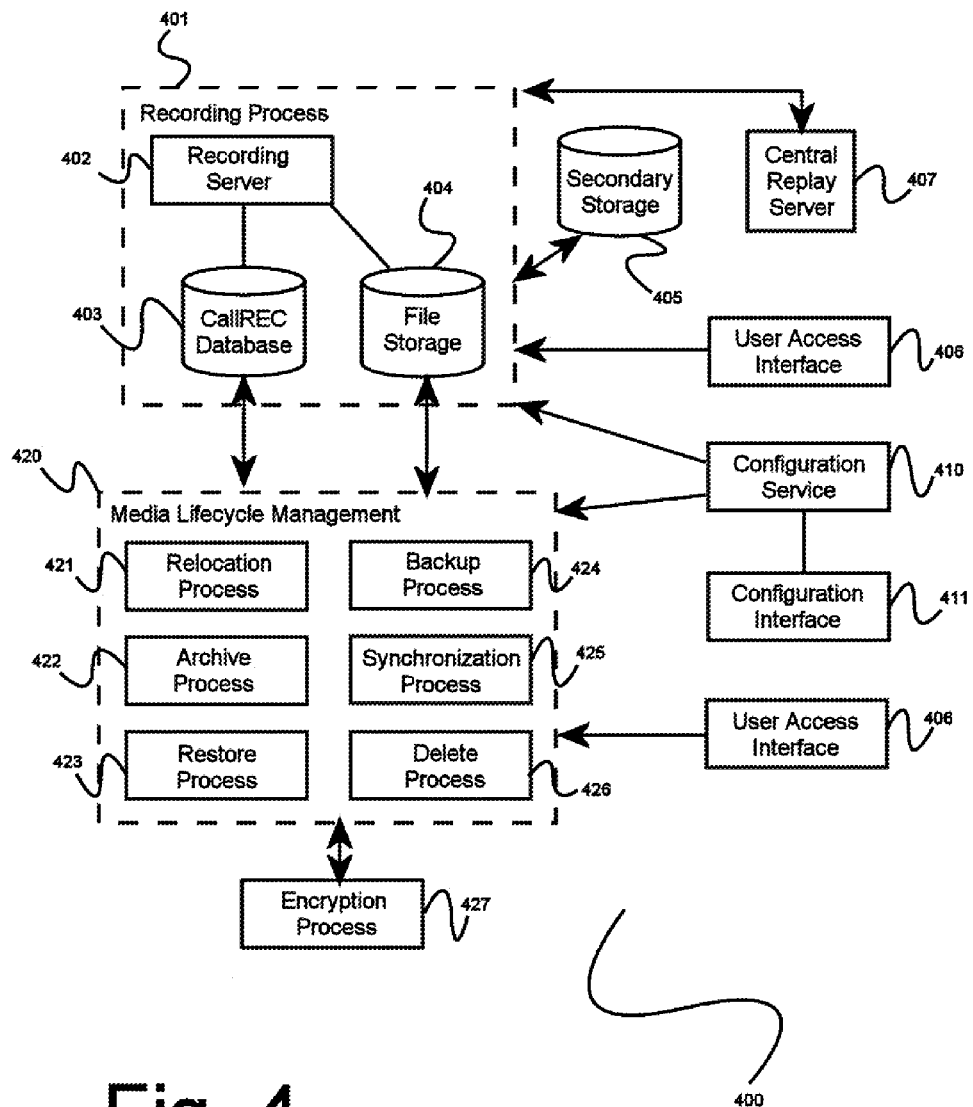
FIG. 4 is a block diagram of a preferred embodiment of the invention, illustrating conceptual architecture elements pertaining to the invention.

FIG. 4 provides a high-level diagram of a preferred embodiment of the invention, which will be useful for discussing aspects of the invention and improvements inherent in the invention over systems known in the art. According to the embodiment, the system provides methods for managing the lifecycle of media in a communication center environment in an efficient manner with an ability to reduce media related issues, provide security and quality of recordings, and ensure that recordings may be rapidly and easily accessible for later review in a communication center environment.

In a preferred embodiment and referring to FIG. 4, a media lifecycle management system 420 is a set of tools that once configured, automatically decide what to do with media interactions recorded by a plurality of communication interaction recording processes 401 (for example, CallREC or other media recording systems known in the art) in a communication center environment. Through configuration interface 411 or by some automatic means, configuration service 410 configures a plurality of recording servers 402 to record communications by capturing and storing communication interactions in a communication center environment. Once a communication is captured, it is stored as a media file in file storage or database 404. Capturing communication interactions involves accepting and processing communications from a plurality of communication devices. For example, phone conversations, VoIP conversations, video conferences, instant messages, transitions in availability presence, screen activity, optical character recognition (OCR) of fax transmissions, and other forms of communication known in the art. Once a communication interaction is recorded, a database record that corresponds to the communication, including metadata, is created and stored for each recorded communication interaction in CallREC database 403. Metadata may, for example, include the date the interaction was stored, the date the interaction was recorded, interaction type, keywords, interaction outcomes, the identity of participants in the recording (for example, names, CallerID, email addresses, etc.) and other information for business classification reasons or to identify the recording as a target in a search. The system may also extract metadata from the interaction automatically (for example, converting audio communications to text via speech-to-text algorithms known in the art and using keywords as metadata), or by prompting a communication participant (for example, a customer service agent), or another user, to add metadata manually through user interface 406. In some embodiments, the system may also use specific mood information (for example, mood detected through processing of acoustical elements of the voice in an audio conversation, facial expression recognition through video recognition in a video conversation, or context based emotion detection from text input in an IM conversation) as metadata. The resulting extracted information may be used to assist users in locating interactions by identifying probable keywords and providing for full text search capability, or may be used on its own. Extracted information may also be stored as a component of metadata, stored with the interaction record in CallREC database 403, or, in another embodiment, stored separately as a source for searching document collections. Recording process 401 may be deployed in a premise or cloud-based manner (or a combination of both) and may or may not require the installation of communication capturing software on a communication device or an associated communication control software component (not shown). In some embodiments, recording communications involves the capturing of more than one stream or leg of communication. For example, in a customer service communication environment, it may be desired for all communication to be recorded for a specific agent. In the case where an agent is having a voice conversation with a customer and a simultaneous IM conversation with a colleague, recording process 401 may capture both streams of conversation (that is, capture the voice conversation with the customer and the IM conversation with the colleague). In this case, a master identifier is added to the interaction record within CallREC database 403 to associate the interactions as having an association to the same set of nested interactions.

Archive process 422 is used to offload recorded interactions within primary storage file storage 404 to a secondary storage 405. Secondary storage may be a lower cost or less convenient form of data storage (for example, high-latency storage medium, Blu-ray™, DVD, tape backup, etc.) and may be located locally or remotely (for example, on a cloud system). It will be appreciated by one having ordinary skill in the art that there are less expensive mediums of storage that make it more feasible and cost effective for which to store large amounts of data. Files recorded by recording process 401 may or may not be in a compressed format and may have one or more types of media components (for example, audio, video, text, etc.). Media in file storage 404 may have a corresponding record within the CallREC database 403 with descriptive data (for example, metadata, master identifiers, etc.). When a request to archive media files is made, archive process 421 creates an archive package (for example, a compressed file such as a "zip", "tar", "gz" file, etc.) with the recorded media elements (for example, audio, video, text, mood, availability presence, etc.) from file storage 404. Additionally, the data record(s), from CallREC database 403, that correspond to the media elements are included within the archive package. Archiving parameters (for example, when to archive, how often to archive, and other attributes) are configured in configuration service 410 and/or initiated by user access interface 460. Archive process 421 connects to file storage database 404 (for example, using a network file system) and saves the files to secondary storage 405. Archived media files are marked in CallREC database 403 with an archive flag visible in user access interface 406 to indicate that the recordings have been archived.

In some embodiments, archive process 421 may integrate to archival systems known in the art (for example Tivoli ESM, EMC Centera, and the like).

In another embodiment, archive process 421 may encrypt data that is to be archived for security reasons. For example, a business may have security policies that would entail that any customer identifying information does not leave the premise unless it is secured by data encryption. It will be appreciated by one having ordinary skill in the art that any of the many known encryption algorithms may be used to alter digital information using an algorithm to make it unreadable to anyone except those who possess special information (for example, an encryption key). The result of the process is encrypted media files. In this case, archive process 421 may use encryption process 427 to encrypt the archive package before it moved to secondary storage 405.

In some embodiments where there may be a plurality of recording processes 401 with a plurality of file storages 404 and a plurality of CallREC databases 403, synchronization process 425 performs synchronization of recorded communication media files from multiple locations to one central location (for example, a primary file storage 404) for central access and archiving. In an arrangement where there are multiple recording processes 401, a communication interaction may be recorded multiple times depending on a configuration within configuration service 410. For example, an instance of recording process 401 (herein, referred to as "system A") is recording all conversations for a particular individual (herein, referred to as, "individual A"). Another instance of recording process 401 (herein, referred to as "system B") is recording all communication for a particular individual (herein, referred to as "individual B"). In this case where system A is configured in configuration service 410 to record all communications for individual A and system B is configured in configuration service 410 to record all communications for individual B, in the event that individual A is communicating with individual B, there may be multiple recordings of the same conversation. In this case, when performing a synchronization function, synchronization process 425 may compare audio streams of the same recording from various sources (that is, from one or more file storages 404) and decide which one is better (that is, better based on quality, completeness, or some other metric). Synchronization process 425 performs a similar comparison for the associated metadata in the communication interaction record from CallREC database 403 to determine which metadata is better (that is, better based on completeness of data, which is more descript, which may have more parameters, or some other metric). In another embodiment, different parts of a communication may be recorded by different recording processes 401. For example, in a customer service communication environment, a customer may call several times to resolve an issue. In the case where the same customer was handled in communication centers where more than one recording processes 401 recorded different conversations but belonging to the same issue (that is, the same subject of conversation over different times on different mediums and perhaps with different individuals), a supervisor may want to listen to the entire communication recording set for the issue. Central replay server 407, in conjunction with synchronization process 425, coordinates the set of conversations belonging to the issue with a conversation identifier so that it can be retrieved later in its completeness.

Backup process 424 performs regular backups of system configuration, settings and recorded communication interactions, to guard against system failures and data loss, to secondary storage 405 or some other location (for example, a commercial cloud backup service, file system, etc.). Backups may be scheduled according to the backup policy as configured in configuration service 410. The backup process creates a copy of the communication interaction media files, with or without associated metadata, without affecting CallREC database 403 and file storage 404. Backup files may have extensive metadata, for example, where the files are, the date that the interaction was stored, the date that the interaction was recorded, interaction type, keywords, interaction outcomes, the identity of participants in the recording (for example, names, CallerID, email addresses, etc.) and other automatic and manual metadata that describes the contents and context of the recorded communication interaction. In some embodiments, backing up data can be configured through configuration interface 411 to be performed on a schedule (for example, as a daily, weekly, monthly, etc. routine process). In another embodiment, backup process 424 can be arranged to provide geographic redundancy, data security, and portability.

Once the archiving and/or backup function described above takes place, secondary storage 405 may hold many one or more communication recordings that may be useful to retrieve at a later time. Restore process 423 is the tool used to retrieve communication recording media files from a backup, archive or some other location (for example, secondary storage 405) to the system for review by user access interface 406. Through the user access interface 406, a user marks one or more interactions to be restored. Since recording process 401 keeps records about interactions in the CallREC database 403, a user of the media lifecycle management system 420 may always see, via user access interface 406, interactions even after they have been archived by archive process 421. For example, a user can use user access interface 406 to see that there is a recorded communication from, for example, extension numbers 8642 to 7323 with the associated agent names and other metadata. In this case, a user may be able to search for calls based on this data, but the call will be marked with an icon (or by other means; a user interface may be a web application, a web service or even some more general API which will mark the call by other means) to show that the interaction has been archived. In order to restore the interaction, a user may mark it for restoration using user access interface 406. The recorded communication media file corresponding to the restoration request may be automatically restored back to file storage 404. In another embodiment, an administrator may receive a notification (for example, an email) requesting to connect the appropriate media that may contain the requested media file (for example tape backup, Blu-ray™, DVD, etc.) in order to restore the archive package to a specified directory. The recorded communication media file (that is, the archive package) corresponding to the restoration request, will be restored to file storage 404. The interaction will then be visible on user access interface 406 with an indication that it has been restored (for example, a pointer to the recording may appear in a specific "restored calls" tab on the user access interface 406). In some embodiments, the restored communication interaction media file is marked with a time interval for which it will be available. The time interval may be set by pre-configuration via configuration service 410, may have a default value, may be set manually by the user, may be set automatically based on file type, or may be set by some other means. When this time interval expires, the communication recording media file will be automatically deleted. For example, in a customer service communication center environment, a customer service supervisor may want to restore a recorded communication (for example, a telephone call between the customer and an agent) to address, for example, a complaint by a customer. The supervisor may want to listen to the communication to review the interaction between agent and customer. Once the supervisor has used the media file for the purpose for which it was restored, the recorded communication may no longer be needed, so the system may automatically delete the interaction from file storage 404. In the event that the file is needed again, (that is, after the time interval has expired and already been deleted from file storage 404), the record of the recorded communication (along with its metadata) still exists in the CallREC database 403 and an archived package still exists in secondary storage 405, so the recorded communication can be restored again, if needed. In another embodiment, a user may request a communication recording that is no longer available within the main system (for example, the communication recording was archived to an off-line tape backup, Blu-ray™, DVD, etc.). In this case, restore process 423 may instruct the system administrator (via an email interaction or by some other means of notification) to insert or connect the appropriate medium so that media files can be restored. Once the communication recording is retrieved and saved, the user requesting the communication recording is informed (for example, by e-mail or some other means).

Although the notion of retrieving a particular communication recording is simple, retrieval in the electronic context can be powerful and is a vast improvement over systems known in the art. Simple retrieval of individual communication recordings may be supported by allowing the user to specify a unique document identifier, one or more keywords, dates that the interactions may have occurred, mood information about the interaction, by indicating media type, and/or any other elements that may be present (or as some approximation) as metadata within CallREC database 403. In another embodiment, a more flexible retrieval allows the user to specify partial search terms involving only a portion of the expected metadata and/or patterns with or without wildcards corresponding to the metadata that an interaction may exhibit.

Relocation process 421 enables you to move recorded communications from one location (for example, file storage 404) to another location (for example, another instance of file storage 404, secondary storage 405, or some other storage medium connected to the system, such as a hard drive, disk array, NFS directory, etc.) while preserving the communication interaction record of the interaction in CallREC database 403. A user can decide, via user access interface 406 which media types (for example, voice video, etc.) of recorded communications should be moved.

Delete process 426 may be set up to run automatically to delete media files or other information associated to a communication recording in the system. A typical example may be to delete screen captures, audio files, database records, other attributes, or a combination of these, at the same or at different intervals. For example, a system administrator may configure delete process 426 via configuration interface 411, to delete video files after, for example, two months, audio after, for example, one year, and database records after, for example, five years. In another embodiment, a system administrator may, for example, configure delete process 426, via configuration interface 411, to delete media files older than one year only if, for example, said media files have already been archived by archive process 421. This example offers protection for recorded communication media files when archive process 421 for whatever reason does not happen. In this case, the calls will not be deleted unless archive process 421 completes successfully. In this case and automatic request may be sent to archive the media files to archive process 421. In another embodiment, a system administrator may configure delete process 426 via configuration interface 411, to delete audio files, of a certain age, once a speech-to-text process (not shown) has been performed on the audio file in order to keep a transcript available for future reference. This would provide a lower cost of storage for a transcript versus an audio file.

Detailed Description of Exemplary Embodiments

Figure 5:
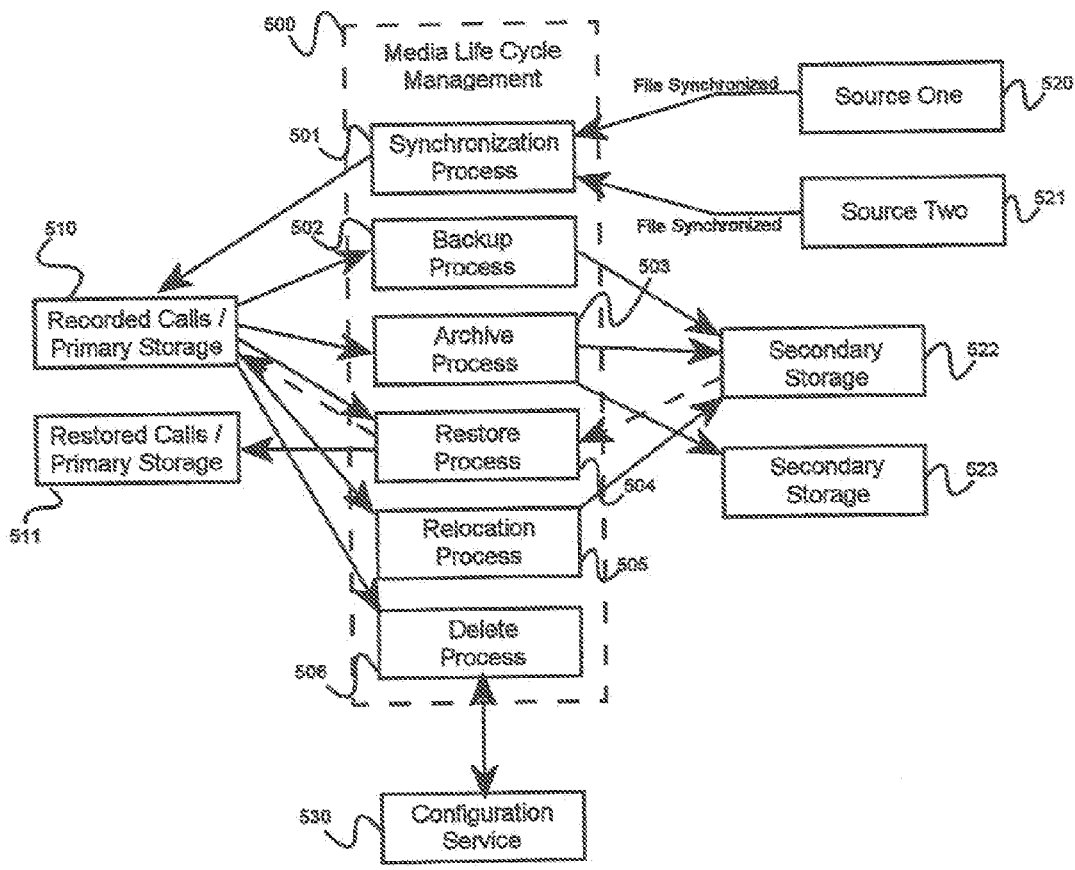
FIG. 5 is a block diagram showing details of a media life cycle management system, according to a preferred embodiment of the invention.

FIG. 5 is a block diagram showing details of a media life cycle management system, according to a preferred embodiment of the invention. Synchronization process 501 performs synchronization of recorded communication media files from multiple file storage locations to primary file storage location for central access and archiving. For example, synchronization process 501 may be configured in configuration service 530 to synchronize media files within two recorded communication media sources, source one 520 and source two 521. As files are recorded by recording process 401, different media files may be present on source one 520 and source two 521. Synchronization process then synchronizes the media files to primary storage 510 to, for example, have a complete set of media files. In this example, the recorded communication media files are now available in primary storage 510 for access by a user and by archive process 503 or any other process in media lifecycle management 500.

Backup process 502 performs backups of system configuration, settings, and recorded communications to guard against data loss (for example, data accidentally deleted, damaged by a virus, hard disk failure, or some other unforeseen issue that can affect the integrity of data), to secondary storage 522 or some other storage location (for example, a commercial cloud backup service, network access storage device or some other connected storage medium). For example, backup process 502 may be configured in configuration service 530 to backup data on a regular interval (for example, weekly). In this example, configuration service 530 indicates one or more subdirectories of primary storage 510 as the source for data to backup and a subdirectory on secondary storage 522 as the destination for the backup. Configuration service 530 may also hold a setting that only specific subdirectories and only specific media. For example, only the audio portion of the recorded communications (i.e. not the video portion), and the metadata are to be backed up on a regular interval (for example, on a weekly basis every Saturday evening). In this example, it may also be configured that a notification (for example, an email) is to be sent to a system administrator once the backup has been completed. The result is that the audio media data and the corresponding metadata is copied form a specified source directories in primary storage 510 to a specified destination directory on secondary storage 522. When the backup process 502 is complete, a notification (for example, an email, SMS, IM, or the like) may be automatically sent to the system administrator. In another embodiment, backup process 502 may be configured in configuration service 530 to backup data based on a metadata value being present or absent in the metadata (for example, backup calls with "Service_Class=GOLD"). In this example, backup selection criteria based on metadata may be combined with one or more Boolean operators (for example, "AND", "OR", and/or "NOT" operators).

Archive process 503 is used to offload recorded communications from primary storage 510 to a secondary storage 522 with little or no user intervention. Secondary storage may be a lower cost or less convenient form of data storage (for example, high-latency storage medium, Blu-ray™, DVD, tape backup, etc.). In some embodiments secondary storage 522 may be a network access storage device, a cloud service, or some other storage medium. For example, archive process 503 may be configured in configuration service 530 to archive communication recordings as recorded by one or more recording processes 401 to a secondary storage 522 automatically once the recorded communication media files in the source (for example, a subdirectory of recorded communication media files on primary storage 510) that were recorded on or before a certain date (for example, a date corresponding to six months prior to the date that the process executed). In this example, it may also be configured in configuration service 530 that all media components (for example, IM transcript in the case that the recorded communication was an IM conversation, audio, in the case that the recorded communication was a telephone call, audio and video, in the case that the recorded conversation was a screen capture in conjunction with a telephone call or the recorded conversation was a video conference, etc.) be archived. Archive process 503 monitors the configured source subdirectories for files that are six months or older. Once archive process 503 detects that a file is six months or older, the media files (in this example, all components of the media files including text, audio and video) are moved to the configured destination location to secondary storage 522. In another embodiment, archive process 503 may be configured in configuration service 530 to backup data based on a metadata value being present or absent in the metadata (for example, backup calls with "Service_Class=GOLD"). In this example, backup selection criteria based on metadata may be combined with one or more Boolean operators (for example, "AND", "OR", and/or "NOT" operators). In another embodiment, a plurality of archive tasks can be configured in configuration service 530 for archive process 503 with different criteria to define different archive policies for communications recordings. For example in a customer service communication environment where customers may be segmented by customer value (for example, high value customers may be labeled "VIP", and regular or lower value customers may be labeled as "normal", etc.), different policies may be configured in configuration service 530 where customers labeled as "VIP" (for example, a "VIP" label within metadata corresponding to the communication recording media file), archive process 503 may archive communication recording media files after two years. In this example, a customer labeled as "normal" (for example, a "normal" label within metadata corresponding to the communication recording media file), archive process 503 may archive communication recording media files after six months.

In another embodiment, archive process 503 may use watermarks as a trigger to execute a movement of recorded communication media files form a source file storage location (for example, primary storage 510) to a destination file storage location (for example, secondary storage location 522). For example, a low watermark may represent a configuration where the amount of free storage that primary storage 510 must always have, such as 50 MB of free storage. Archive process 503 monitors primary storage 510 and when available storage falls below 50 MB of free space, a pre-configured archive task commences. For example, archive process 503 detects that the storage of primary storage 510 has fallen below the low watermark of 50 MB of free space and an archive process to archive a set of media files commences (for example, media files with the oldest dates in primary storage 510). Archive process 503 then begins to move media files to secondary storage 522. In another embodiment, archive process 503 may use a high watermark as a trigger for stopping a movement of recorded communication media files to a destination. For example, configuration service 530 may be configured to stop archive process 503 if destination secondary storage 522 reaches a capacity of, for example, 90% capacity or more. In this example, a notification (for example, to a configured email address as configured in configuration service 530) may be sent to a system administrator, indicating that secondary storage 530 is reaching capacity. As such, archive process 503 may stop moving data to secondary storage 522. In another embodiment, configuration service 530 may be configured with one or more secondary storage locations for archiving, relocation, and backup purposes. In the case where a high watermark is reached on the first secondary storage 522 (herein, referred to as "archive destination A"). That is, archive process 503 has reached the high watermark threshold for the first archive destination A, archive process 503 may change the archive destination to a second configured secondary storage 523. Archive process 503 may send a notification (for example, an email).

Since media life cycle management systems 500 keeps a record of all available recorded communications in CallREC database 403 irrespective of the location of where the media files are located (that is whether the media is on primary storage 510, secondary storage 522, or some other storage medium), a user can request a communication recording from recording process 401 via user access interface 406. If a requested communication recording is marked with an icon (or by other means; a user interface may be a web application, a web service or even some more general API which will mark the call by other means) indicating that the corresponding media file has been previously archived, restore process 504 is used to retrieve media files from the archive location (for example, secondary storage 522) and copy it to primary storage 510 and/or primary storage 511, so that it may be accessible by a user. In some embodiments where the archive location is a removable storage media (for example, a low cost media such a tape backup, Blu-ray™, DVD, etc.), restore process 504 may send a notification (for example, an email, SMS, etc.) to a system administrator to load the media so that the restore process 504 may continue. In a preferred embodiment, a representation of a restored communication recording on user access interface 406 may appear in a location reserved for restored media that may be different from where regular recorded calls appear (for example, user access interface may have a "restored communication" tab in addition to a "recorded communication" tab). This adds convenience to retrieve the communication recording once restore process 504 is complete as the media was specifically requested and will likely need to be accessed as soon as it becomes available. Once a recorded communication media file has been restored, the corresponding record within user access interface 406 is marked with a time interval for which it will be available. The time interval can be a default value (for example, as configured in configuration service 530), or, in some embodiments, be manually set or modified by the user via user access interface 406. The time interval indicates the duration for how long the restored media file will be available before it will be automatically deleted from primary storage 510 and/or primary storage 511. Logically, since the media file was specifically requested, it would be reviewed by the requestor via user access interface 406 once it became available, or if the media file was not reviewed, it may no longer be needed after the time interval expires. Once a media file is deleted, if a user requires review of the media file again, she can restore it again using restore process 504 and the method described above.

Relocation process 505 moves recorded communication media files from the primary storage 510 and saves it to secondary storage 522. Secondary storage 522 can be any storage medium known in the art connected to media lifecycle management 500. For example, a secondary hard drive, disk array, NFS directory, and the like. A user can decided which types of media files to move. For example, video, audio, text, etc.

Delete process 506 is a tool used to delete media files, database records, and/or other data in the media lifecycle management system 500. For example, recorded communication media files such as screen capture, audio conversations, video conferencing, IM conversations, database records, and other forms of recorded communications that may be stores in primary storage 510, CallREC database 403, secondary storage 522 or any other storage medium connected to the media lifecycle management 501. A request to delete process 506 to delete recorded communication media files and records on offline removable storage (for example, media saved to tape backup, Blu-ray™, DVD, etc.) may be requested. In this case, a request is sent (for example, via email) to a system administrator to connect the removable media to media lifecycle management 500. Furthermore, a user may request that only portions of a recorded communication media file be deleted (for example, delete only the video portion of the media file). Delete process 506 may be requested manually as well as run in an automated fashion with an enhanced configuration (for example, delete video files after two months, delete audio after one year, delete CallREC database 403 records after five years, etc.). Delete process 506 may be configured through configuration service 530 to follow deletion rules to safeguard data. For example, if media lifecycle management system is configured to not allow the deletion of files unless they have been archived, delete process 506 may not allow a delete function to execute until the media file has been archived. In this example, a user may be notified via user access interface 406. In another embodiment, media lifecycle management system 500 may be configured via configuration service 530 to keep an electronic textual transcript of any audio recording that are requested for deletion. In this example, delete process 506 may request an speech-to-text process (not shown) to automatically transcribe the audio media file and request archive process 503 to archive the transcript will all associated information before the audio file is deleted.

Figure 6:
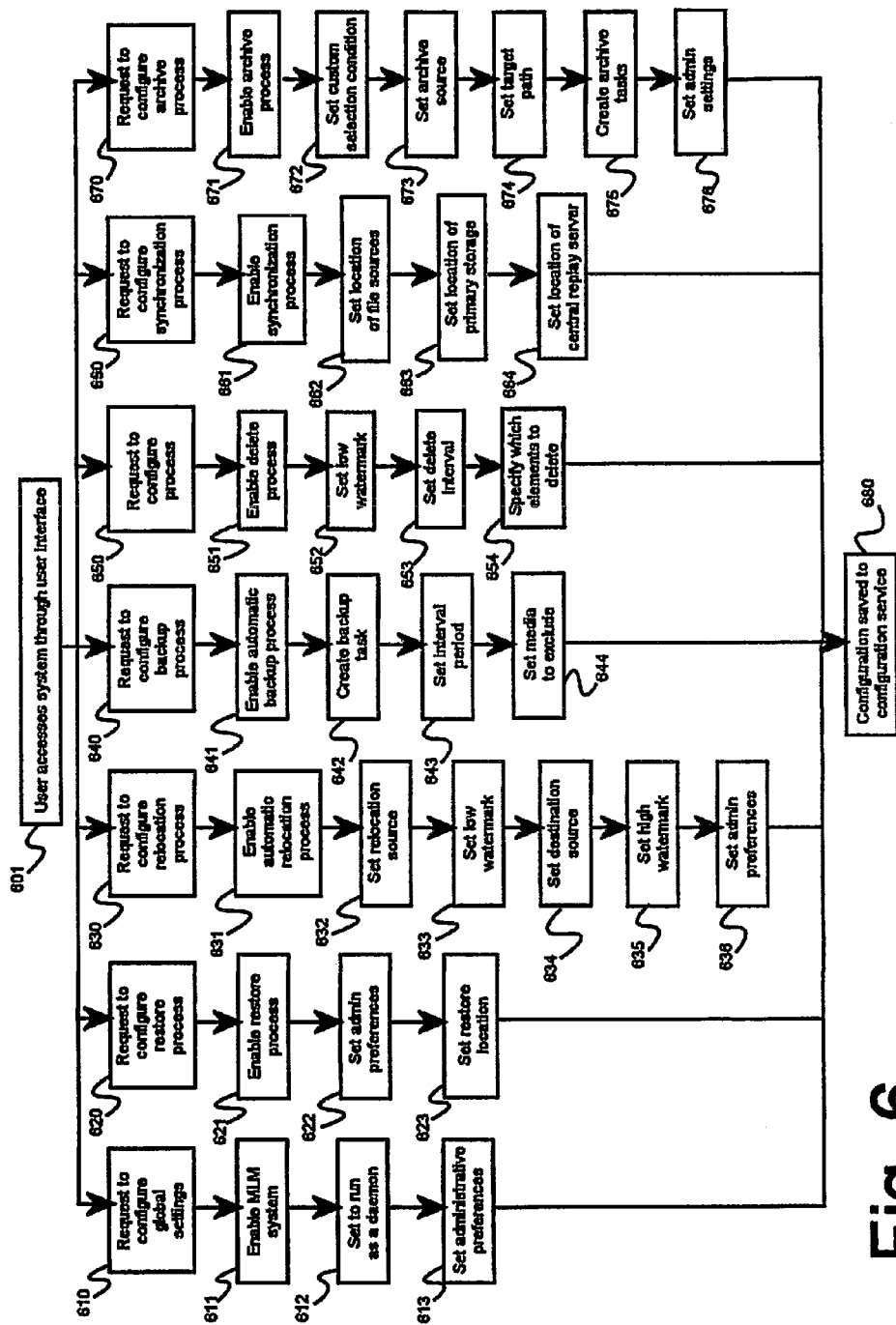
FIG. 6 is a process flow diagram illustrating a method of setting up a media life cycle management system to manage recorded communications in a communications environment according to a preferred embodiment of the invention.

FIG. 6 is a process flow diagram illustrating a method of setting up a media life cycle management system to manage recorded communications in a communications environment according to a preferred embodiment of the invention. In a preferred embodiment, media lifecycle management system 420 is intended to be configured in a way such that many of the tasks may be performed automatically, rather than just being under the direct control of an interactive user, in order to reduce complexity of management of recorded communications media, increase accuracy of task execution, and reduce costs significantly for the establishment. For example, a company has a policy to store all recordings for one year and all screen captures for two months. By having an automated process perform the media lifecycle management, a reduction in the dependency on human interaction is enjoyed each time that media must be archived, relocated, etc. thus reducing human error that may occur. Furthermore, automation of managing media lifecycle optimizes productivity beyond what is possible with human labor.

Referring again to FIG. 4, in step 601, a user accesses the media lifecycle management system 420 using configuration interface 411 to set the configuration for the management of recorded communication media within one or more recording processes 401. In step 610 on receiving a request to set global settings. In step 611, a user enables media life cycle management system 420. Enabling media lifecycle management system 420 allows for the management of recorded communication media files to be managed automatically and/or under the control of an interactive user. In the next step 612, a user can set the media lifecycle management system 420 to run as a daemon. That is, to have media lifecycle management system 420 run as a background process, rather than being just under the direct control of an interactive user. In this configuration, the system can be further configured to run with little or no control by an interactive user, but at any time, a user may control various aspects of the system. In step 613, a user can set the administrative preferences (for example, an email address for a person who may need to be notified of any system issues, events, or faults). The configuration is then saved to configuration service 410 in step 680.

In step 620, a request to configure restore process 423 is received. In step 621, a user enables restore process 423. Restore process 423 is the tool used to retrieve communication recordings from a backup, archive or some other source (for example, secondary storage 405) to the system for review by user access interface 406. In step 622, a user can set the administrative preferences for restore process 423 (for example, an email address for an individual who may be interested in a notification of the result of an execution of a restore process 423 at run-time). In step 623, a user can configure a restore location. That is, the destination location on file storage 404 where a restored media file will be copied. The configuration is then saved to configuration service 410 in step 680.

In step 630, a request to configure relocation process 421 is received. In step 631, a user enables automatic relocation process 421. That is, enable the automatic movement of recorded communications media files from one location (for example, file storage 404) to another location (for example, another instance of file storage 404, secondary storage 405, or some other storage medium connected to the system, such as a hard drive, disk array, NFS directory, etc.) while preserving the communication interaction record corresponding to said media file in CallREC database 403. In step 632, a source location is configured. This may be where the data requested to be moved, is located (for example a subdirectory on file storage 404). In step 633, a low watermark is configured. A low watermark, for example, indicates, for example, when the available storage space for a particular target location reaches a certain minimum level (for example, file storage 404 may have only 50 MB left). In this case, an automatic relocation of data may be triggered. In step 634, a destination location is set (for example, a subdirectory on another instance of file storage 404). In step 635, a high watermark is configured. A high watermark, for example, indicates when the amount of data in a storage location reaches a maximum acceptable level (for example, a second instance of file storage 404 is 90% full, thus automatic relocation of data will stop in order to avoid write errors due to overcapacity of storage). In step 636, administrative options are set (for example, an email address for a person who may need to be notified of system issues, events, or faults during the execution of a relocation process). The configuration is then saved to configuration service 410 in step 680. In another embodiment, multiple destinations for communication recording media file relocation can be configured in configuration service 410 each with their own priority, balance and high watermark settings. This allows using multiple destinations (for example, secondary storage 522 and secondary storage 523) which may be load balanced and/or prioritized according to configured parameters within configuration service 410. If, for example, a high watermark is reached in secondary storage 522, said destination may be skipped and media files may be moved to another destination, for example, secondary storage 523, until its high watermarks is reached as well, and so on.

In step 640, a request to configure backup process 424 is received. In step 641, a user enables automatic backup process 424. In step 642, a backup process task is named and configured (for example, a name to distinguish a backup process from a plurality of backup processes is set, a source location where the files to backup reside, such as a subdirectory on file storage 404, and a destination location of where to copy the files, for example a subdirectory on secondary storage 405). In step 643, an interval period is set for backup process 424. The interval period specifies how often to run an automatic backup of data (for example, weekly, monthly, etc.). In step 644, a user can configure which media types to exclude (for example, in some embodiments, a user may only want to backup audio recordings, but not video recordings, thus video would be excluded). The configuration is then saved to configuration service 410 in step 680.

In step 650, a request to configure delete process 426 is received. In step 651, a user enables automatic delete process 426. The delete process decides when to automatically delete data for a given file storage location (for example a subdirectory on file storage 404) depending on a configured watermark and/or other circumstances (for example, an automatic delete process may only happen if the data has been previously archived). In step 652, a low watermark is configured. A low watermark, for example, indicates when the available storage space for a particular target location reaches a certain minimum level (for example, file storage 404 may have only 50 MB of storage left), a delete process of data will be triggered. Delete process 426 may occur when certain attributes are configured, for example, delete only video data and not audio data, delete data that has been reviewed, etc. In some embodiments, delete process 426 may only be available for deleting files that are accessible via online systems: that is, in some embodiments archived files stored for example on long-term storage systems such as tape drives or optical archives may be inaccessible for delete process 426.

In step 660, a request to configure synchronization process 425 is received. In step 661, a user enables automatic synchronization process 425. Synchronization process 425 performs synchronization of recorded communication media files from multiple locations selected in step 662 (for example, across a plurality of file storages 404) to primary file storage 404 for central access and archiving. In step 663, the location of a plurality of file storages 404 are configured (for example, a subdirectory in each file storage 404 where the media files are stored by recording server 402). In step 664, the location of primary storage 510 is configured (for example, a subdirectory in primary storage 510 that is used for accessing communication recordings for review). In step 665, the location of the central replay server 407 is configured so that recorded communication belonging to the same family is assigned an identifier and may be recreated at a later time. The configuration is then saved to configuration service 410 in step 680.

In step 675, a user configures the archive tasks (for example, different combinations of what media files to archive, which parts to archive, such as audio only, and other configurations of archive process 421. In step 670, a request to configure archive process 421 is received. In step 671, a user enables automatic archive process 421. Archive process 421 is used to offload recorded interactions within one or more primary storage file storage 404 to one or more secondary storage 405. In step 672, the custom selection conditions are set. For example, archive process 421 may archive all files that are of a certain age, such as files that are twelve months or older. In another example, archive process 421 archives only the audio portion of the communication recording of media files of a certain age. In step 673, a user configures the source of where files to be archived by archive process 421 are located (for example, a subdirectory on file storage 404). In step 674, a user configures the target path of where files are to be archived to by archive process 421 (for example, a subdirectory on secondary storage 408). In step 676, administrative options are set (for example, an email address for a system administrator who may need to be notified of any system issues, events, or faults during the execution of an archive process). The configuration is then saved to configuration service 410 in step 680.

Figure 7:
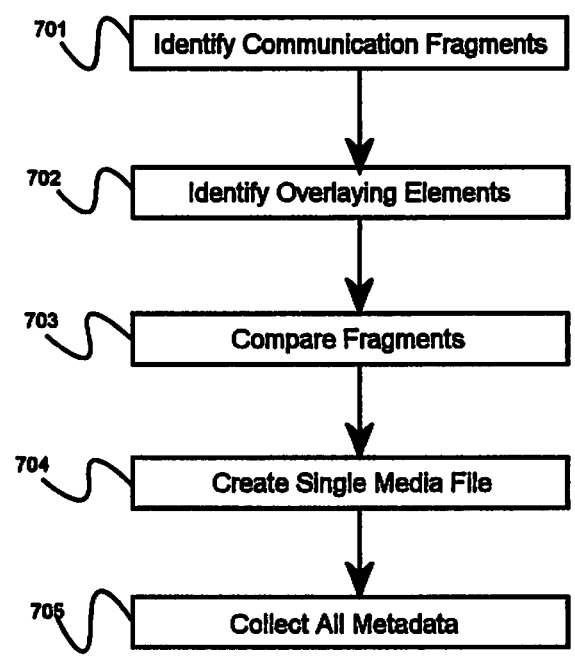
FIG. 7 is a process flow diagram illustrating a method for managing distributed interactions for recording communications in a communication center environment, according to a preferred embodiment of the invention.

FIG. 7 is a process flow diagram illustrating a method for managing distributed interactions for recording communications in a communication center environment, according to a preferred embodiment of the invention. In one embodiment, a recorded communication may have multiple communication "fragments". A communication fragment can refer to a portion of a communication that happened before another portion with, for example, different participants. For example, in a customer service communication center, two customer service agents are on a call with a customer. In an environment where communications are being recorded, where there may be a plurality of recording processes 401, each agent's call may be recorded along with the customer. In this example, a call might start recording with one instance of recording process 401 (herein, referred to as "record server A"), which may at some point stop recording (for example, in the event that the first agent exits the conversation), and recording by another instance of recording process 401 (herein, referred to as "record server B"), whereas record server B continues to record the second agent. Furthermore, the first agent may re-enter the conversation and record server A would then resume recording. In this example, there are now three communication fragments, the first segment and the third segment have been recorded by two recording processes 401. In step 701 synchronization process 501 identifies three communication fragments in source one 520 and source two 521 by comparing media file identifiers through the recorded communication record in CallREC database 403. In the next step 702, synchronization process 501 identifies the overlapping elements (for example by identifying the overlapping fragments using the time codes on the recorded communication media files). In step 703, synchronization process 501, compares the overlapping fragments and identifies which fragment may be of better quality (for example, recorded at a higher sampling rate). Synchronization process 501, in step 704 collects the best fragments and creates a single media file for indexing, playback, and storage purposes. In step 705, synchronization process 501 collects the metadata from all fragments and writes it to the corresponding communication record in CallREC database 403.

Figure 8:
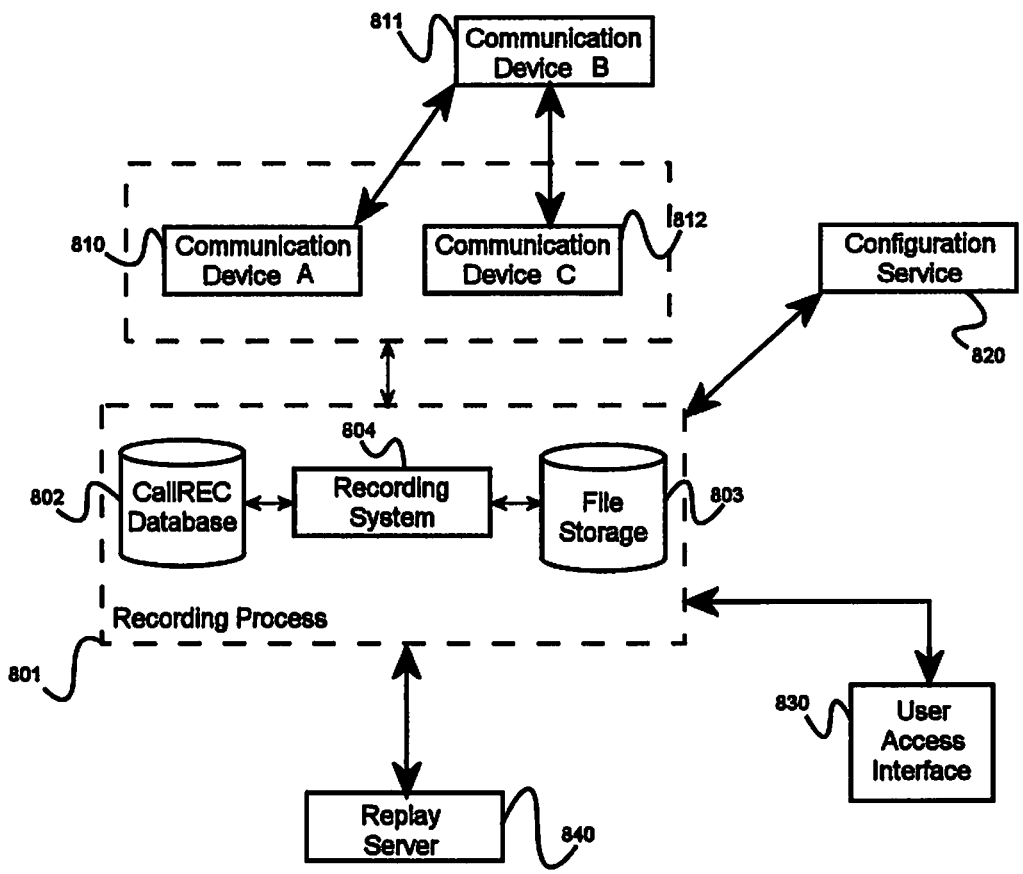
FIG. 8 is a block diagram illustrating a method for managing a nested set of interactions, according to a preferred embodiment of the invention.

FIG. 8 is a block diagram illustrating a method for managing a nested set of interactions, according to a preferred embodiment of the invention. In a preferred embodiment, recording process 801 may be configured to record all communications for a give target including simultaneous conversations across all mediums to one or more other communication recipients. In this example, communication device A 810 (for example, an agent in a customer service communication environment) is configured in configuration service 820 to have all communications across all mediums (for example, audio, IM, VoIP, video conferencing, screen capture, etc.) recorded. When communication device A 810 starts communication via VoIP to communication device B 811 (for example, a customer in an outbound dialing campaign in a customer service communication center environment), communication between communication device A 810 and communication device B 811 are recorded by recording server 804 and saved to file storage 803. Record server 804 assigns a unique master identifier to identify recordings belonging to the same recording target, communication device A 810. While communication device A 810 and communication device B 811 are communicating, communication device A 810 begins an instant message conversation with communication device C 812 (for example, another agent in the customer service communication environment). Since the recording target, communication device A 810, has been configured in a previous step, to capture all simultaneous conversations, recording server 804 will also capture the IM conversation packets between communication device A 810 and communication device C 812 in addition to capturing the VoIP conversation packets between communication device A 810 and communication device B 811 to file storage 803 and assigns the same master identifier to the recording. Once the communication session (that is all communications have terminated, for example, communication device A 810 is idle) the master identifier and any associated metadata are written to the recorded communication record to CallREC database 802.

When a user requests to review communication recordings via user access interface 830 for communication device A 810, replay server identifies, through the master identifier, that there are nested communications and presents the topography of the communication recording to user access interface 830. A user will then be able to select one or more communications streams to review for recording target communication device 810.

Figure 9:
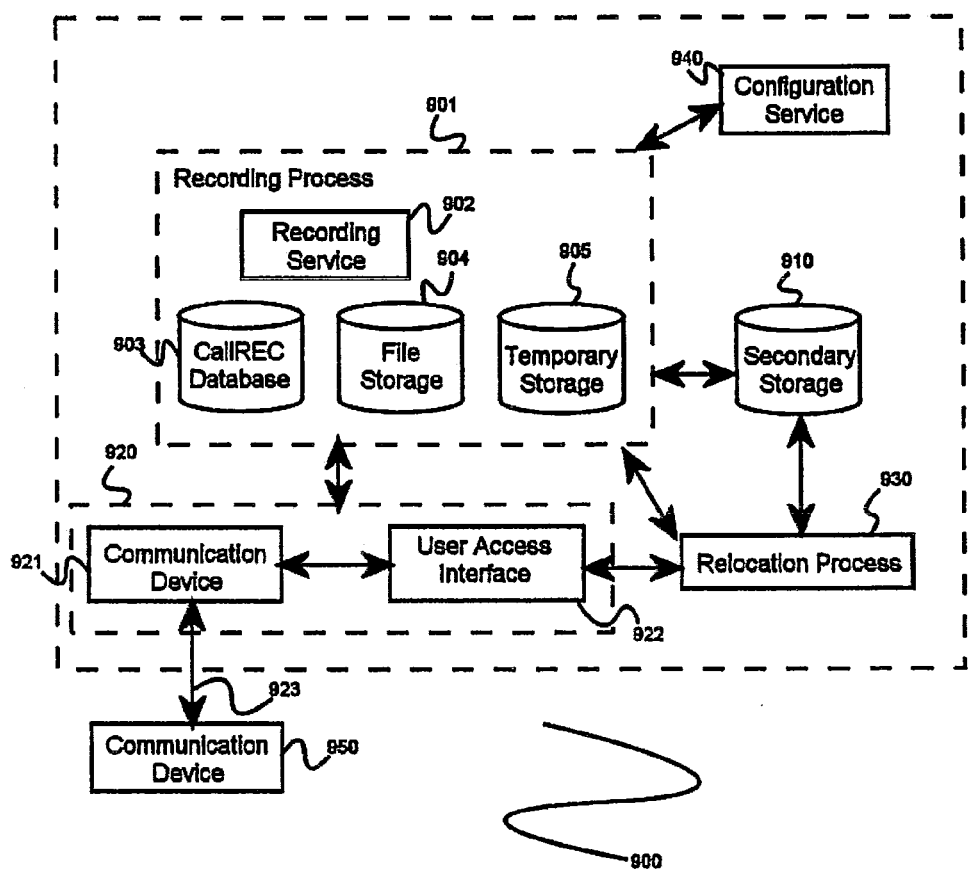
FIG. 9 is a block diagram illustrating a method for predictive recording of communications in a communications environment, according to a preferred embodiment of the invention.

FIG. 9 is a block diagram illustrating a method for predictive recording of communications in a communications environment, according to a preferred embodiment of the invention. In a preferred embodiment, recording process 901 may be configured to record all communications for a give target including simultaneous conversations across all mediums to one or more other communication recipients. Communication environment 900 may follow various configurations as to when to initiate communication recordings for communication environment 900. For example, in the case of a financial sales group within a customer service communication center, a system administrator may want to configure communication recordings for only sales but not for customer service related communication. In another example, a communication center may want to record communications for a particular group of agents that are, for example, in training. In a preferred embodiment, it would be desired to record all communications for every communication device so that if any communication required review, a system administrator would be able to retrieve a recorded communication when needed. In systems known in the art, this is not feasible considering the cost of storage for recorded communication.

Configuration service 940 is configured to record all communications across all mediums (for example, voice, video, screen capture, IM, etc.) in a predictive fashion for communication environment 900. When communication device 921 initiates a VoIP communication interaction 923 to communication device 950, recording server 902 captures communication 923 (herein, referred to as "temporary recording") to temporary storage 905. When communication 923 is finished, user 920 may enter metadata or other information describing the interaction via user access interface 922 (for example, a call reason code, call outcome, a requirement for follow-up, etc.) and the information is written to CallREC database 903. User 920 may also decide, that the recording should be retained and selects to retain temporary recording via user access interface 922, User access interface 922 then automatically sends a notification to relocation process 930 with an identifier (for example, a unique ID, location information, etc.) corresponding to the temporary recording. Relocation process 930 moves temporary recording from temporary storage 905 to file storage 904 and updates the location fields for the communication record in the CallREC database 903. The communication recording is available for future review. In a similar example, user 920 may decide to discard temporary recording or to not retain temporary recording by no action. In this case, an automatic notification is sent by user access interface 922 to relocation process 930 to move temporary recording to secondary storage 910 (for example, a low cost storage medium such as tape backup, Blu-ray™, DVD, etc.). The recording is now available via restore process 425. This represents an improvement over systems known in the art in that even though a user may decide that a communication recording is not needed, it may be retrieved nonetheless if needs change.

Figure 10:
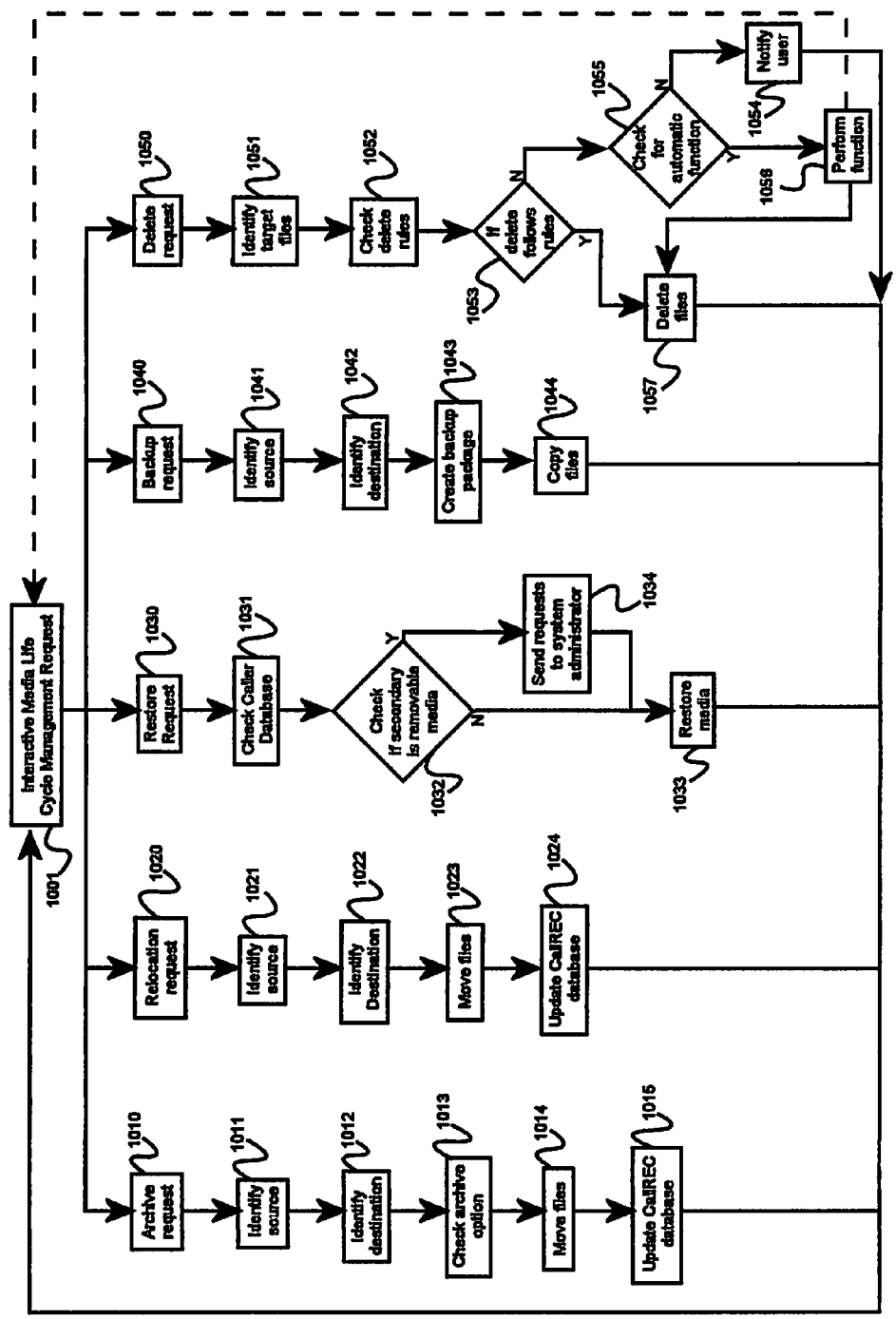
FIG. 10 is a process flow diagram illustrating an interaction media lifecycle, according to a preferred embodiment of the invention.

FIG. 10 is a process flow diagram illustrating an interactive media lifecycle management, according to a preferred embodiment of the invention. In step 1001 a request is received to manage media lifecycle management 420. In step 1010 a request (for example a user request via user access interface 406, or by some automatic means) to archive one or more communication recording media file(s) is received by archive process 421 which included information for archive (for example source and destination of media files). Step 1011 identifies the source location (for example, a subdirectory in file storage 404) of the media files to archive. Step 1012 identifies the destination (for example, a subdirectory in secondary storage 405). Step 1013 checks the archive option (for example, options contained within the request or options configured in configuration service 410). Archive option can be, for example, only archive the text portion of the communication, or only archive the audio portion of the communication, etc. or a combination of options. In step 1014, archive process 421 creates archive package which is stored to archive destination secondary storage 405, after archive package is stored in secondary storage 405, media files may be copied or moved from primary storage 404. In step 1015, the record, in CallREC database 403, which corresponds to the media files, is updated with the new location of the media files.

In step 1020 a request (for example a user request via user access interface 406, or by some automatic means) to relocate one or more communication recording media file(s) is received by relocation process 421 which includes information for relocation (for example source and destination of media files). Step 1021 identifies the source location (for example, a subdirectory in file storage 404) of the media files to relocate. Step 1022 identifies the destination (for example, another subdirectory in file storage 404). Step 1023 moves the files from the source subdirectory in file storage 404 to the destination subdirectory in file storage 404. The record, in CallREC database 403, which corresponds to the media files, is updated with the new location of the media files in step 1024.

In step 1030 a request (for example a user request via user access interface 406, or by some automatic means) to restore one or more communication recording media file(s) is received by restore process 423 which includes information for restoration (for example one or more files to restore). In step 1031 the location of the media file is retrieved from the corresponding communication recording record in CallREC database 403. In step 1032 the location of the media file is checked, for example secondary storage 405. If secondary storage 405 is a removable media type (for example tape backup, Blu-ray™, DVD, etc.) then in step 1034 a request is sent to a system administrator (for example, via an email address configured in configuration service 410) to connect the media source to the communication environment 400. In step 1033, the media files are restored from secondary storage 405 to file storage 404.

In step 1040 a request (for example a user request via user access interface 406, or by some automatic means) to backup one or more communication recording media file(s) is received by backup process 422 which includes information for backup (for example source of media files and destination for backup). Step 1041 identifies the source location (for example, a subdirectory in file storage 404) of the media files to relocate. Step 1042 identifies the destination (for example, a subdirectory on secondary storage 405). Step 1043 a backup package is created (for example, a compressed file such as a "zip" file) and in step 1044, the media files are copied from the source subdirectory in file storage 404 to the destination subdirectory in secondary storage 405. The record, in CallREC database 403, which corresponds to the media files, is updated indicating that the media files have been backed up.

In step 1050 a request (for example a user request via user access interface 406, or by some automatic means) to delete one or more communication recording media file(s) is received by delete process 426 which includes information pertaining to media files, database records, etc. to delete (for example, location of files to delete). Step 1051 identifies the files to delete (for example, a file in file storage 404). Step 1052 checks the delete rules. Delete rules can be included in the delete request or pre-configured in configuration service 410. An example of delete rules may be that before a file can be deleted, it must have been previously archived using archive process 421. Another example of a delete rule may be that before an audio recording is deleted, it must be transcribed and saved within CallREC database 403. Another example of a delete rule may be that if a communication interaction record in CallREC database 403 is to be deleted; all associated media files will be deleted as well. Step 1053 checks the delete rules to see if the delete request complies with the rules. If the request does not comply (for example, the requested files to delete have not been archived), then step 1055 attempts to determine if there may be an automatic rectification of the issue (for example, delete process 426 may request archive process 421 to archive the requested files prior to deletion). If the automatic function is not successful, then a notification (for example, an email to the user or via user access interface 406) is sent in step 1054. If the automatic function is available, then the function is performed (for example, media files are archived by archive process 421) in step 1056. In step 1057, the files are deleted.

The skilled person will be aware of a range of possible modifications of the various embodiments described above. Accordingly, the present invention is defined by the claims and their equivalents.

What is claimed is:

1. A system for media lifecycle management for recorded media in a contact center environment, the system comprising:
   a plurality of recording servers operating on network-attached computers and configured to record a plurality of interactions in a contact center;
   a call recording database stored and operating on a network connected computer and configured to store metadata pertaining to storage locations of recordings of the plurality of interactions in the contact center;
   a media lifecycle management service operating on a plurality of network-attached server computers and comprising software modules configured to carry out a relocation process, an archive process, a backup process, a restore process, a delete process, and a synchronize process;
   a configuration service operating on a plurality of network-attached server computers; and
   a plurality of data storage devices attached to a network and each accessible to at least one recording server and to the media lifecycle management service and the configuration service;
   wherein the relocation process of the media lifecycle management service, on receipt of a request from a user to relocate media data, relocates a first plurality of files comprising media from a recorded interaction from a first storage location to a second location while modifying a set of metadata in the call recording database pertaining to the recorded interaction by changing at least an indicia of a current storage location of recorded media;
   wherein the archive process of the media lifecycle management service, on receipt of a request from a user or when required by one or more archive rules stored in the configuration service, removes a second plurality of media files pertaining to a first plurality of recorded interactions from the data storage service and archives the second plurality of media files on a long-term storage medium, while modifying a set of metadata in the call recording database pertaining to the first plurality of recorded interactions by changing at least an indicia of a current storage location of the first plurality of media files;
   wherein the backup process of the media lifecycle management service, on receipt of a request from a user or when required by one or more backup rules stored in the configuration service, creates copies of a third plurality of media files pertaining to a second plurality of recorded interactions from the data storage service and backs up the third plurality of media files on a long-term storage medium, while modifying a set of metadata in the call recording database pertaining to the third plurality of recorded interactions by changing at least an indicia of a current backup storage location of the second plurality of media files;
   wherein the restore process of the media lifecycle management service, on receipt of a request from a user or when required by one or more restore rules stored in the configuration service, retrieves copies of a fourth plurality of media files pertaining to a third plurality of recorded interactions from a long-term storage medium and restores the fourth plurality of media files to the data storage service, while modifying a set of metadata in the call recording database pertaining to the third plurality of recorded interactions by changing at least an indicia of a current storage location of the fourth plurality of media files;
   wherein the delete process of the media lifecycle management service, on receipt of a request from a user or when required by one or more automatic deletion rules stored in the configuration service, deletes copies of a fifth plurality of media files pertaining to fourth plurality of recorded interactions from the data storage service, while modifying a set of metadata in the call recording database pertaining to the fifth plurality of recorded interactions by changing at least an indicia of a current storage status to indicate that the fifth plurality of recorded interactions was deleted;
   wherein the synchronize process of the media lifecycle management service, on receipt of a request from a user or when required by one or more synchronization rules stored in the configuration service, retrieves full or partial copies of a sixth plurality of media files pertaining to a specific recorded interaction from the data storage service and synchronizes the sixth plurality of media files, wherein synchronizing the sixth plurality of media files produces a single media file corresponding to the specific recorded interaction, while modifying a set of metadata in the call recording database pertaining to the specific recorded interaction by adding at least an indicia of a current storage location of the synchronized media file; and
   further wherein a recording server, when a storage level of a first storage server reaches a high water mark, ceases sending call recording data to that storage server and begins sending recording data to a second storage server.

2. A method for media lifecycle management for recorded media in a contact center environment, the method comprising the steps of:
   recording an interaction in a contact center using one of a plurality of recording servers operating on network-attached server computers;
   storing, in a call recording database stored and operating on a network connected computer and configured to store metadata pertaining to storage locations of recordings of the plurality of interactions in the contact center, metadata pertaining to the recorded interaction, the metadata comprising at least a location of a first data file comprising recorded audio from the interaction; and
   managing a plurality of recorded interactions using a media lifecycle management service operating on a plurality of network-attached servers accessible to the plurality of recording servers and to the data storage system, the media lifecycle management system comprising software modules configured to carry out a relocation process, an archive process, a backup process, a restore process, a delete process, and a synchronize process;
   wherein the relocation process of the media lifecycle management service, on receipt of a request from a user to relocate media data, relocates a first plurality of files comprising media from a recorded interaction from a first storage location to a second storage location while modifying a set of metadata in the call recording database pertaining to the recorded interaction by changing at least an indicia of a current storage location of recorded media;

wherein the archive process of the media lifecycle management service, on receipt of a request from a user or when required by one or more archive rules stored in the configuration service, removes a second plurality of media files pertaining to a first plurality of recorded interactions from the data storage service and archives the second plurality of media files on a long-term storage medium while modifying a set of metadata in the call recording database pertaining to the first plurality of recorded interactions by changing at least an indicia of a current storage location of the second plurality of media files;

wherein the backup process of the media lifecycle management service, on receipt of a request from a user or when required by one or more backup rules stored in the configuration service, creates copies of a third plurality of media files pertaining to second plurality of recorded interactions from the data storage service and backs up the third plurality of media files on a long-term storage medium, while modifying a set of metadata in the call recording database pertaining to the third plurality of recorded interactions by changing at least an indicia of a current backup storage location of the second plurality of media files;

wherein the restore process of the media lifecycle management service, on receipt of a request from a user or when required by one or more restore rules stored in the configuration service, retrieves copies of a fourth plurality of media files pertaining to third plurality of recorded interactions from a long-term storage medium and restores the fourth plurality of media files to the data storage service, while modifying a set of metadata in the call recording database pertaining to the third plurality of recorded interactions by changing at least an indicia of a current storage location of the fourth plurality of media files;

wherein the delete process of the media lifecycle management service, on receipt of a request from a user or when required by one or more automatic deletion rules stored in the configuration service, deletes copies of a fifth plurality of media files pertaining to fourth plurality of recorded interactions from the data storage service, while modifying a set of metadata in the call recording database pertaining to the fifth plurality of recorded interactions by changing at least an indicia of a current storage status to indicate that the fifth plurality of recorded interactions was deleted;

wherein the synchronize process of the media lifecycle management service, on receipt of a request from a user or when required by one or more synchronization rules stored in the configuration service, retrieves full or partial copies of a sixth plurality of media files pertaining to a specific recorded interaction from the data storage service and synchronizes the sixth plurality of media files, wherein synchronizing the sixth plurality of media files produces a single media file corresponding to the specific recorded interaction, while modifying a set of metadata in the call recording database pertaining to the specific recorded interaction by adding at least an indicia of a current storage location of the synchronized media file; and further wherein a recording server, when a storage level of a first storage server reaches a high water mark, ceases sending call recording data to that storage server and begins sending recording data to a second storage server.

\* \* \* \* \*